Aug. 20, 1935.  B. SASSEN  2,012,249
AUTOMATIC POSITIONING MECHANISM FOR MACHINE TOOLS
Filed Aug. 17, 1933  7 Sheets-Sheet 3

Inventor
BERNARD SASSEN
By AHKParsons
Attorney

Aug. 20, 1935.  B. SASSEN  2,012,249
AUTOMATIC POSITIONING MECHANISM FOR MACHINE TOOLS
Filed Aug. 17, 1933  7 Sheets-Sheet 4

Inventor
BERNARD SASSEN
By AHParsons
Attorney

Aug. 20, 1935.  B. SASSEN  2,012,249
AUTOMATIC POSITIONING MECHANISM FOR MACHINE TOOLS
Filed Aug. 17, 1933  7 Sheets-Sheet 5

Inventor
BERNARD SASSEN
By H.K. Parsons
Attorney

Inventor
BERNARD SASSEN

Patented Aug. 20, 1935

2,012,249

UNITED STATES PATENT OFFICE 2,012,249

AUTOMATIC POSITIONING MECHANISM FOR MACHINE TOOLS

Bernard Sassen, Cincinnati, Ohio, assignor to The Cincinnati Milling Machine Company, Cincinnati, Ohio, a corporation of Ohio Application August 17, 1933, Serial No. 685,614

19 Claims. (Cl. 90—16)

This invention relates to machine tools and more particularly to improvements in automatic measuring or sizing devices therefor.

In the operation of machine tools, the size of the work is usually predetermined during set-up of the machine by relative adjustment between tool and work support and in such a manner that subsequent movement therebetween will yield the desired dimensions. In preparing to machine plane surfaces for instance, consideration may have to be given to the relative position of the tool and work along any one or all of the three rectangular coordinates while in round or circular work, attention is more particularly directed to the radial dimension. In any case, these adjustments have usually been effected manually, which is a slow and tedious process, especially in precision work or where several settings have to be made in the machining of a single piece.

One of the objects of this invention is to provide an improved mechanism for effecting measurement along any axis of adjustment quickly and accurately thereby decreasing the set-up time and conversely increasing the productivity of the machine.

Another object of this invention is to provide an improved mechanism for the aforesaid purposes which may be preset for any prescribed measurement and subsequently power actuated, to effect said measurement automatically and without further attention on the part of the operator.

A further object of this invention is to provide a mechanism of the character described which will operate at a fast rate during a major portion of the adjustment and then automatically decelerate thereby preventing overrun and insuring a quick and accurate setting.

An additional object of this invention is to provide an improved electrical control mechanism for the aforesaid purposes.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference characters indicate like or similar parts.

This invention proposes incorporating in a machine tool a mechanism which may be operatively connected to the actuator that effects adjustment along any axis of measurement and which may be pre-set, so that upon subsequent power operation, the prescribed distance will be measured automatically, thereby determining the size of the work.

One embodiment of this invention is illustrated in connection with a machine tool, such as that shown in Figure 1, in which the reference numeral 10 indicates a column or support, having one set of guideways 11 formed thereon for reciprocably supporting a work table 12; and another set of guideways 13 for adjustably receiving a tool carrier 14. In the present construction the tool is mounted in a tool spindle 15 which is rotatably mounted in the carrier for power actuation.

In this type of machine, the tool is usually a rotary cutter, such as 16, which is adapted to be supported, by an arbor 17, above the work table 12. If now the work piece to be tooled is of such size that it may be mounted directly upon the table 12, the determination of its thickness would be established by relative adjustment between the cutter and work support. In the machine shown, this relative adjustment is obtained by rotation of an elevating screw 18 which is attached at one end with the carrier for movement therewith and which passes through a nut 19 fixed with the bed 10. The screw 18 has a splined connection with a clutch member 20 which serves as the actuator for the screw.

Figure 1:
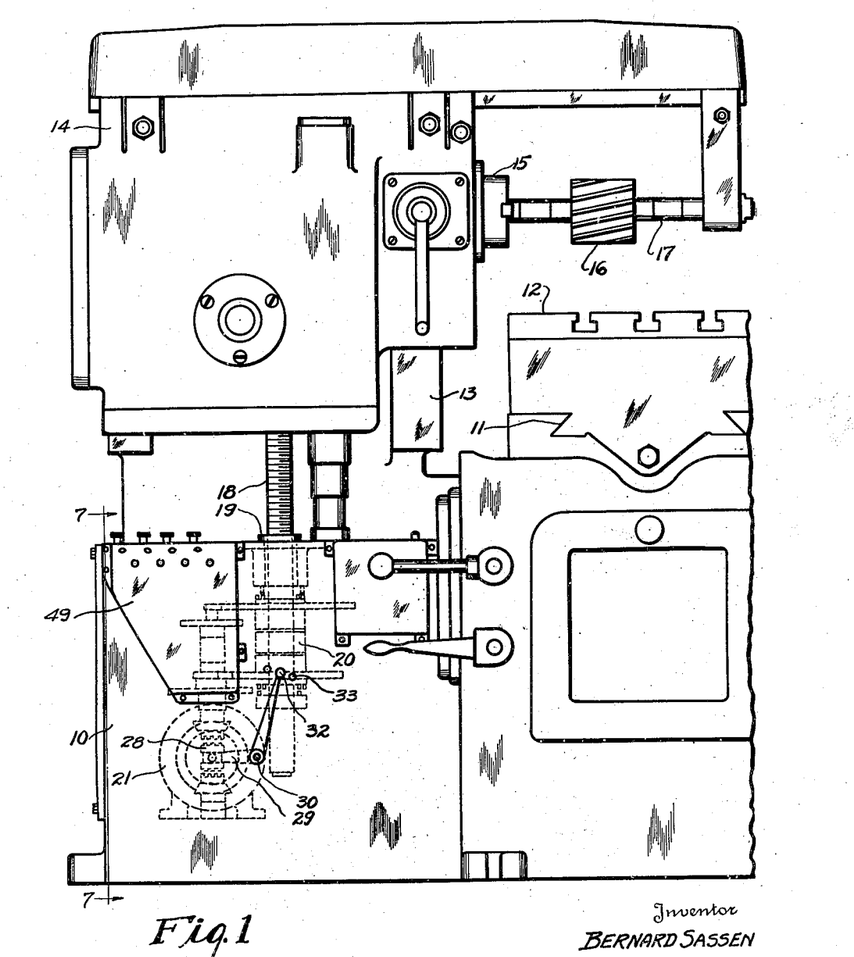
Figure 1 is an elevation of a machine tool showing one form of the invention applied thereto.
Figures 6, 7, 21, 22, 23:
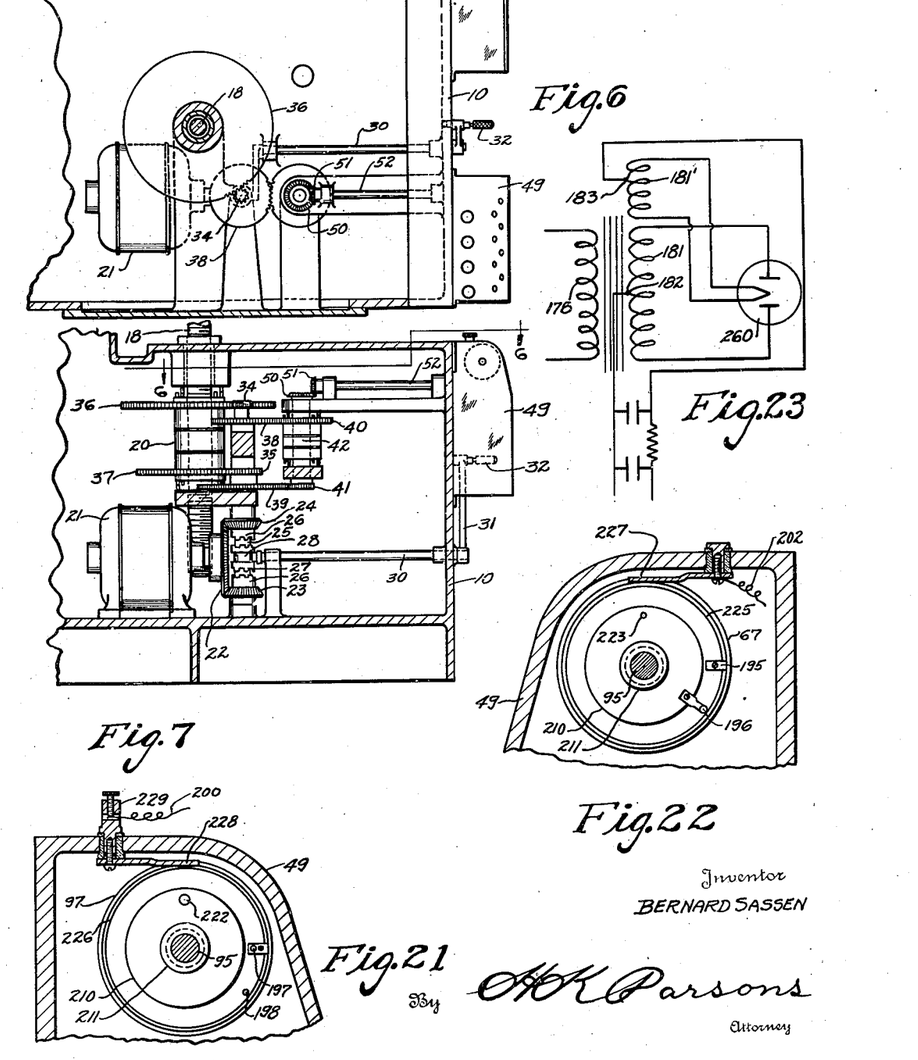
Figure 6 is a section on the line 6—6 of Figure 7.
Figure 7 is a section on the line 7—7 of Figure 1.
Figure 21 is a section on the line 21—21 of Figure 3.
Figure 22 is a section on the line 22—22 of Figure 3.
Figure 23 is a diagram of the rectifying circuit.
Figures 8, 9, 10, 11, 12:
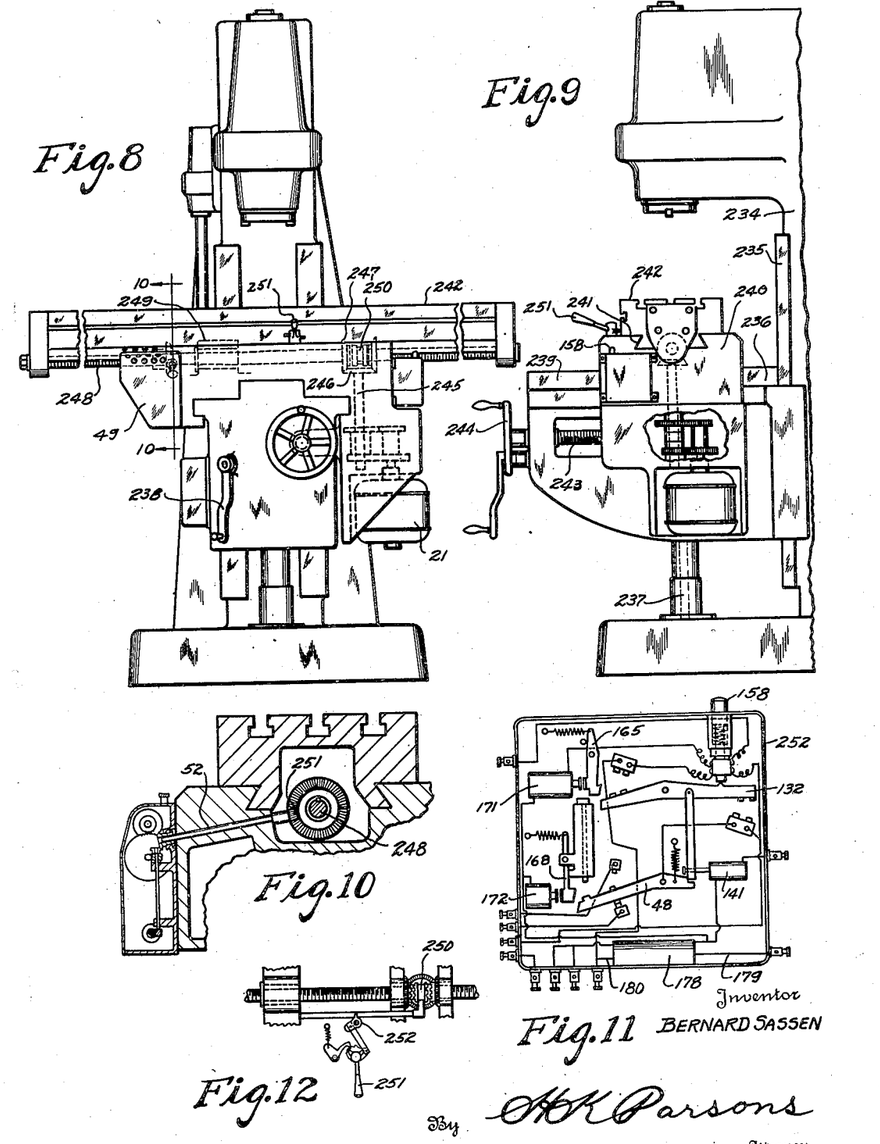
Figure 8 is a view showing the invention applied to another form of machine tool.
Figure 9 is a partial side elevation of the machine shown in Figure 8.
Figure 10 is a section on the line 10—10 of Figure 8.
Figure 11 is a view showing the interior of the control box.
Figure 12 is a detail view of the control mechanism for the reverse clutch of the machine shown in Figure 8.

A power driven transmission may be provided for rotating the actuator, and, as shown in Figures 1 and 7, may include a prime mover 21 mounted in the bed of the machine having a bevel gear 22 secured to the armature shaft thereof. This gear meshes with a pair of bevel gears 23 and 24 mounted for free rotation on the vertical shaft 25. Each of these gears have clutch faces 26 adapted for engagement with complementary clutch faces 27 formed on opposite sides of the reverser clutch 28. The bevel gears 23 and 24 are driven in opposite directions and therefore the axial position of the clutch 28 will determine the direction of rotation of shaft 25. The clutch 28 is provided with a shifter fork 29 pivotally mounted on shaft 30 which extends through the forward part of the machine for receiving the manual operating handle 31. This handle has a spring pressed detent 32 in the outer end thereof adapted to cooperate with three sockets 33 formed in the side of the bed for retaining the clutch in any one of three positions. It will thus be seen that the shaft 25 may be driven in either one of two directions; or that the clutch may be moved to a neutral position to disconnect all power from the shaft.

The shaft extends upward and has mounted thereon a first pair of spur gears 34 and 35 which mesh respectively with spur gears 36 and 37 coaxial of the elevating screw 18; and a second pair of spur gears 38 and 39 meshing respectively with spur gears 40 and 41 mounted for free rotation on the shaft 42.

Figure 2:
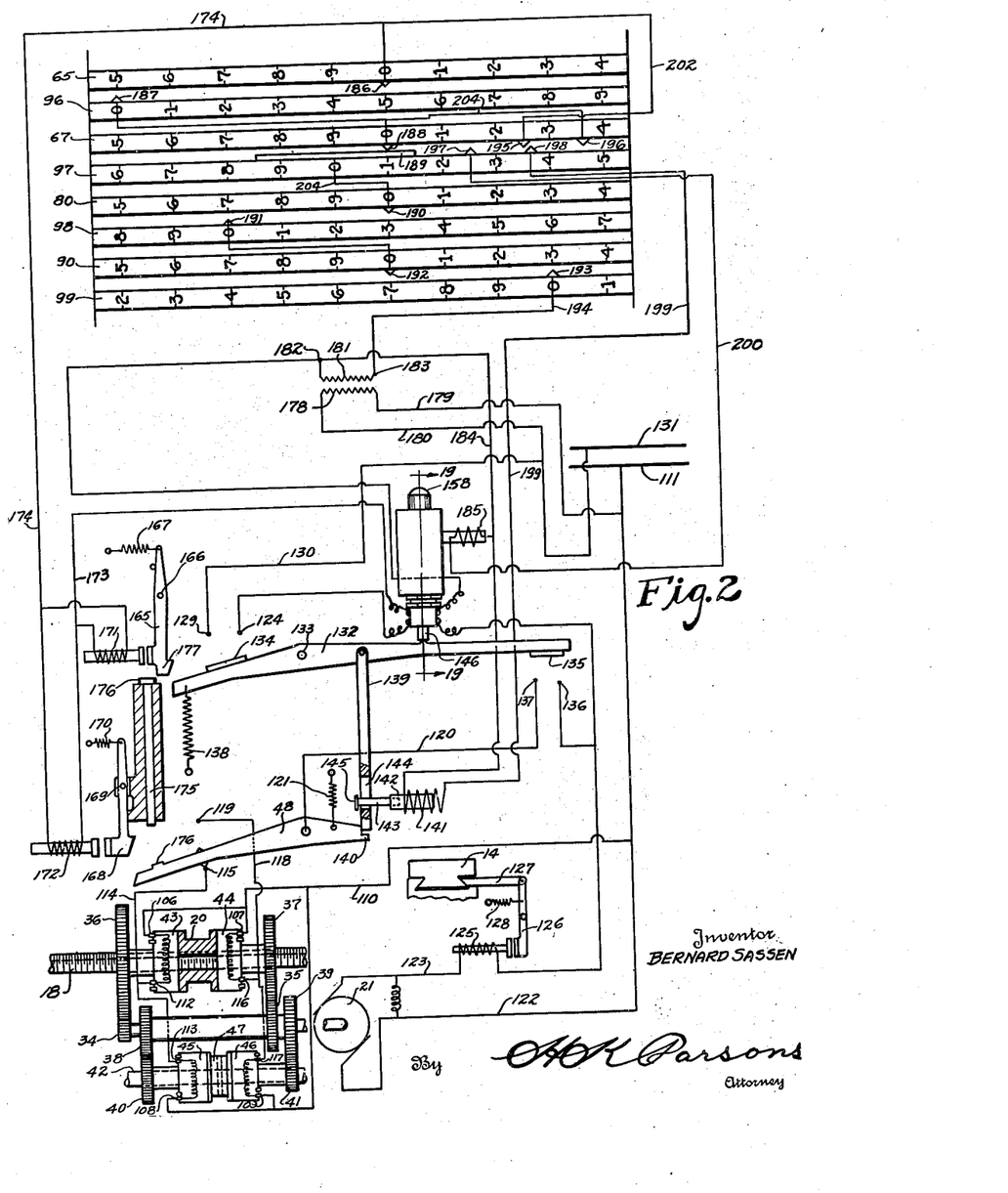
Figure 2 is a diagram of the electrical control circuit embodying the principles of this invention.

Referring to Figure 2, the gear 36 is adapted to be connected to the clutch member 20 by the magnetic clutch 43, while the gear 37 is adapted to be connected to the clutch 20 by the magnetic clutch 44. The gears 40 and 41 are adapted to be connected by electrical magnets 45 and 46, respectively, to the clutch member 47 which is integrally secured to the shaft 42. The magnets 43 and 45 are electrically connected in parallel for simultaneous operation, and the magnets 44 and 46 are likewise connected in parallel for simultaneous operation. Attention is invited to the fact that the ratio of gears 34, 36 to gears 38, 40, and of gears 35, 37 to gears 39, 41 is such that regardless of whether the screw is being driven by gear 34 or gear 35, the same predetermined number of revolutions will be imparted to shaft 42 for each revolution of the screw. This insures that regardless of the speed of rotation of the screw, the counting mechanism will accurately record the distance traveled. It will be noted that the gear 34 is smaller than the gear 35, so that when the former is connected to the screw the slide 14 will be moved at a slow rate, and when the gear 35 is connected to the screw the slide will move at a fast rate. A two-position control switch 48 is provided for determining which pair of magnetic clutches is to be energized and therefore may be termed the rate control switch.

Figures 3, 4:
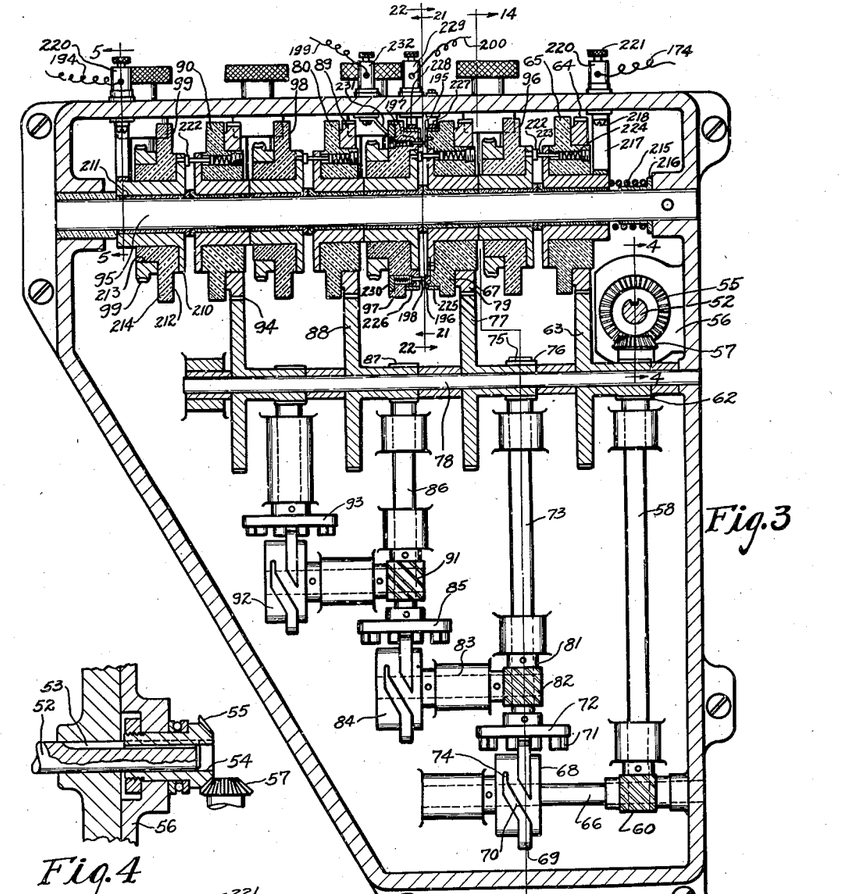
Figure 3 is a vertical section through the meter box.
Figure 4 is a detail section on the line 4—4 of Figure 3.

For the purpose of automatically recording any distance that the slide may travel, a linear measuring meter box 49 is attached to the machine and is connected to the shaft 42 through the following mechanism. A bevel gear 50, secured to the end of shaft 42, meshes with a bevel gear 51 fixed to the end of shaft 52. As shown in Figure 4, this shaft has a splined end 53 which is adapted to engage the splined bore 54 of bevel gear 55 that is journaled in the rear wall 56 of the box 49. This forms a detachable connection and makes it possible to remove the box 49 at any time desired and also facilitates assembly with the machine.

Mounted in the box 49 are two sets of dials, one set being termed the rotary dials because they are permanently connected with the screw 18 for rotation therewith, and the other set may be termed the adjustable dials, because these dials are adapted for manual adjustment to preselect the desired measurement that the slide is to be moved. In the initial set-up of the machine the rotary dials are so connected to the mechanism that they will all read zero when the axis of the cutter spindle is in the plane of the table.

The rotary dials are driven by the following mechanism: Referring to Figure 3 the bevel gear 55 meshes with bevel gear 57 secured to the end of vertical shaft 58 which has secured to its lower end a spiral gear 59 meshing with an equal spiral gear 60 as more particularly shown in Figure 14. A second spiral gear 61 keyed to the shaft 58, meshes with a spiral gear 62 integral on the hub of gear 63. The ratio of the spiral gears 61, 62 is one to one so that one revolution of the shaft 58 will effect one revolution of gear 63. This spur gear meshes with an equal size spur gear 64 integrally secured with the rotatable dial member 65. The ratio of the spiral gears 59 and 60 is one to one so that the shaft 66 supporting spiral gear 60 will be rotated one revolution for one revolution of the rotatable dial 65. The shaft 66 serves to rotate a second rotatable dial 67, but this dial is in a one to ten ratio with respect to dial 65 so that if the dial 65 is graduated to thousandths of an inch, the dial 67 will record hundredths of an inch.

The actuation of the dial 67 is intermittent however, rather than continuous, and to this end a cam member 68 is keyed to the shaft 66 having an annular rib 69 formed thereon which is divided at 70 to form a track for any one of a plurality of pins 71 secured to a disk 72 pinned to a shaft 73. These pins are ten in number and are spaced from each other a distance equal to the thickness of the rib 69. At the division point 70 the rib has a hooked portion 74 which is adapted after completion of nine-tenths of a revolution of shaft 66 to engage the next pin and during the final one-tenth of a revolution move the pin a sufficient distance to effect one-tenth of a revolution in the shaft 73. The shaft 73 has a spiral gear 75 secured to the upper end thereof meshing with a spiral gear 76 fixed to the hub of spur gear 77 which is mounted for free rotation on the shaft 78. This gear meshes with spur gear 79 integral with the rotatable dial 67. After the dial 67 has made one revolution, a third rotary dial 80 is provided which is connected by a one to ten reduction mechanism with the shaft 73. This connecting means is similar to the reduction mechanism connecting shaft 66 to 73 and includes a spiral gear 81 keyed to shaft 73 meshing with spiral gear 82 fixed to the end of shaft 83 which shaft carries a cam member 84 similar to the cam member 68. This cam member cooperates with the pin plate 85 fixed to the end of shaft 86 so that during the last tenth of a complete revolution of shaft 83 the shaft 86 will be moved through one-tenth of a revolution. The shaft 86 is connected by spiral gearing 87 to spur gear 88 which in turn meshes with the spur gear 89 fixed to the rotary dial 80. If so desired, a fourth rotary dial 90 may be provided for recording each revolution made by the rotary dial 80 in which case it would be connected to the shaft 86 through spiral gearing 91, cam 92, pin plate 93 and spur gearing 94. There is thus provided four rotary dials, each one in succession being connected to the next one in a one-to-ten ratio, or in other words, in accordance with the decimal system, and if the first dial is utilized for recording thousandths of an inch, the next dial will record hundredths of an inch, the next dial tenths of an inch, and the last dial will record inches.

Figure 14:
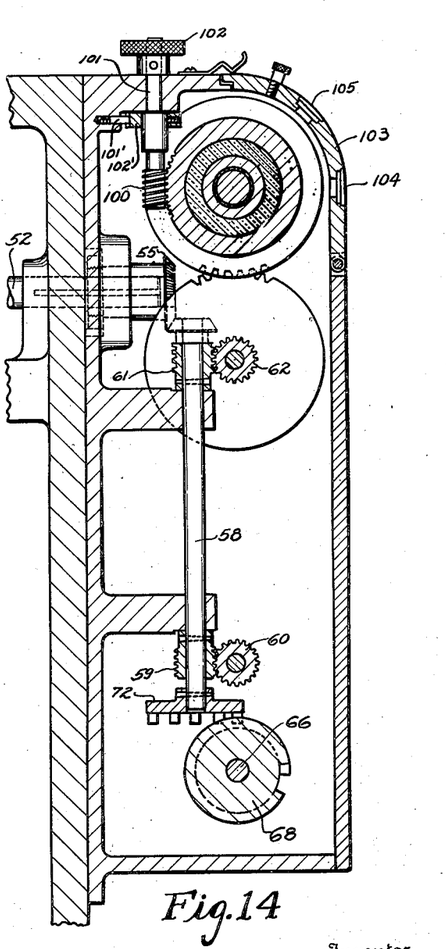
Figure 14 is a sectional view on the line 14—14 of Figure 3.

Associated with the respective rotary dials, are adjustable dials 96, 97, 98 and 99 mounted for free rotation on the shaft 95 and each provided with an integral worm gear 99 meshing with a worm 100 which, as shown in Figure 14, is secured to the end of a vertical shaft 101. This shaft extends through the top of the meter box and is provided with a knurled operating handle 102. A pivoted cover plate 103 is secured to the top of the box in adjacent relation to the various dials for access thereto for any adjusting purposes and is also provided with two sets of windows 104 and 105. The set of windows 104 are opposite the rotary dials 65, 67, 80 and 90 and in such position as to show only one figure on the dial at a time. The other set of windows 105 are located opposite dials 96, 97, 98 and 99 and it will be noted that these are mounted in a row which is spaced from the row of windows 104. The row of windows 105 is utilized when preselecting a desired measurement and therefore are spaced from the other windows to avoid confusion therewith by the operator. The worm 100 may be in one-to-ten ratio with the worm gear 99 so that one revolution of the knob 102 will effect one tenth of a revolution of the dial. To avoid guess work in setting the dial, a spring pressed detent 101' may be mounted in the box to engage a single notch in a disk 102' integral with shaft 101 after each revolution thereof.

The electrical circuit for automatically controlling the operation of the magnetic clutches and thereby the starting and stopping of the prime mover 21 will now be explained. One terminal 106, 107, 108, and 109 of solenoids 43, 44, 45 and 46 respectively are connected in parallel by conductor 110 to one of a pair of electrical mains 111. The other terminals 112 and 113 of solenoids 43 and 45 are connected in parallel by the conductor 114 to the switch point 115. The remaining terminals 116 and 117 of magnets 44 and 46 are connected by the conductor 118 to the switch point 119. These switch points are arranged upon opposite sides of the rate selector switch 48 so that when it is in one position the conductor 120 will be connected to the switch point 115 and magnets 43 and 45 will be energized to cause relatively slow movement of the spindle carrier; and when the switch 48 is in the other position, magnets 44 and 46 will be energized to effect a relatively high rate of movement of the spindle carrier. A spring 121 normally maintains switch lever 48 in its low speed position.

The motor 21 is connected by conductor 122 directly to the power main 111. The other terminal of the motor is connected by line 123 to the switch point 124 but serially through contacts 255 and 256 normally closed by switch point 257, the purpose of which will be explained hereafter. It will be noted from Figure 2 that this line passes in series through the brake operating solenoid 125. This solenoid operates on the pivoted brake lever 126 which has a brake shoe 127 connected to one end thereof for engaging a portion of the carrier 14. A spring 128 normally maintains the brake shoe in contact with the carrier but when the lines 122 and 123 are connected to the power mains the solenoid 125 will be operated to withdraw the brake shoe automatically during operation of the prime mover. A second switch point 129, in series with the switch point 124, is connected by the conductor 130 to the other power main 131. A motor starting and stopping switch 132 is pivotally mounted at 133 for electrically connecting the switch points 124 and 129 and carries a contact block 134 formed of electrical conducting material for this purpose. The switch points 124 and 129 may be of a resilient nature, such as spring pressed plungers having a limited amount of axial movement so as to insure equalization of the contact pressures of the two points and insure proper electrical contact.

The switch lever 132 carries a second contact block 135 secured to its opposite end which is adapted to close the switch points 136 and 137 to complete the circuit to line 120. A spring 138 is provided for normally maintaining the switch 132 open.

Means have been provided whereby the switch 48 may be moved to a high speed position by the main switch under certain conditions and comprises a pivoted interference link 139 which in its normal position engages a lug 140 projecting from the end of the switch lever 48. It is sometimes desired, however, as more fully explained hereafter, that the switch 48 should not be moved to a high speed position simultaneously with the main switch, that the link 139 be disengaged to permit operation or movement of the rate switch 48 from its high speed position to its low speed position without disturbing the position of the main switch. In order that these various functions may be performed automatically, a solenoid 141 is provided having a reciprocable plunger 142 having a reduced portion 143 adapted to pass through an elongated slot 144 in the link 139 so that the link may be moved up and down without interference from the plunger, but the plunger has an enlarged head 145 for engaging and withdrawing the link from the path of movement of the lug 140. It will thus be seen that when the link is held in a withdrawn position that operation of the main switch will not effect operation of the rate selector switch, and further that when both switches have been moved to a closed position that withdrawal of the link 139 will permit movement of the switch 48 independent of the starting switch.

Figure 19:
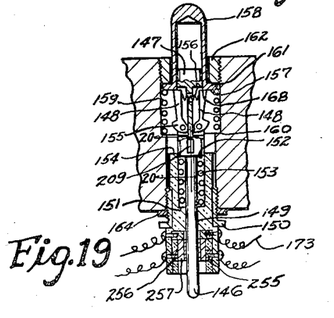
Figure 19 is a section through the starting button as viewed on line 19—19 of Figure 2.
Figure 20:
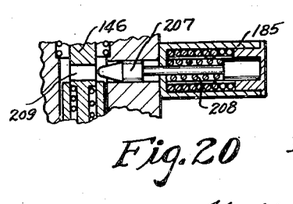
Figure 20 is a detail section on the line 20—20 of Figure 19.

The main switch is closed by a push button, Figure 19, which includes a plunger 146 adapted to contact the main switch lever 132. This plunger has an enlarged cylindrical portion 147 in which is pivotally mounted a pair of latch pawls 148. The lower end of the plunger slides in bore 149 formed in the end of the adjustable sleeve member 150. This sleeve has a shoulder 151, and a spring 153 is interposed between this shoulder and the shoulder 152 formed on the plunger for normally exerting an upward pressure on the plunger to maintain the same in a withdrawn position and normally just out of contact with the switch lever 132.

The lower end of the sleeve 150 is threaded in the surrounding housing for adjusting the position of the inner end 154 thereof so as to determine the timing of contact with the inclined faces 155 formed on the latch pawls 148. A spring 156 is interposed between these pawls to normally maintain them in an outwardly projected position so that they will engage the lower end 157 of the hollow push button 158. A spring 159 is interposed between a shoulder 160 and a peripheral flange 161 formed on the lower end of the push button for normally maintaining the same in an upward position. A threaded sleeve 162 serves to limit the upward position of the push button.

The plunger 146 carries the contact piece 257 which is insulated from the plunger. This piece is movable with the plunger relative to the oppositely positioned contacts 255 and 256 and also to a second pair of oppositely positioned contacts 258 and 259. It will be noted from Figure 19 that the last pair of contacts will be the last to be closed upon upward movement of the plunger 146.

The operation of this device is as follows: When the operator depresses the button 158 the lower face 157 of the push button engages the projecting latch pawls 148 and thereby causes downward movement of the plunger 146 which in turn moves the switch member 132. This movement continues until the contact pieces 134 and 135 are about to engage the respective switch points, at which time the bevel faces 155 on the latch pawls will engage the upper end of the sleeve 150 and cause inward movement of the pawls. This inward movement will continue for the additional axial movement it is necessary to impart to the push button to effect complete closing of the switch. At the time the switch points are completely closed, the latch pawls should have been moved inward sufficient to clear the lower face 157 of the push button so that the spring 153 will come into action to effect withdrawal of the plunger 146 even although the push button 158 is depressed by the operator. This mechanism acts as a safety feature to effect instant withdrawal of the plunger 146 even although the operator's hand is still on the button and leaves the switch 132 free to open should the necessity arise before the operator has seen fit to release the push button. Furthermore, it will be noted that the circuit to the motor is not completed until the plunger has been withdrawn. A lock nut 164 is threaded on the end of the sleeve for securing the same in any adjustable position that determines the tripping of the plunger 146.

A pair of electrically operated latches have been provided for maintaining the switch levers 132 and 48 in their respective positions and includes the latch 165, pivoted at 166, having a spring 167 for normally maintaining the same in a latching position. A second latch 168, pivoted at 169, has a spring 170 for normally maintaining the same in a position to latch the switch lever 48. The latch 165 has tripping magnet 171, and the latch 168, tripping magnet 172, which magnets are connected in parallel to the conductors 173 and 174. Since these solenoids are connected in parallel, any energization of the lines 173 and 174 will effect simultaneous operation of both magnets, but it will be recalled that it was desirable that the mechanism operate at a high speed for a certain period and then at a low speed, and this requires that the latch 168 be released before the latch 165 in order to permit movement of the switch lever 48 to its low speed position independent of the starting switch 132.

Mechanical means have been provided for effecting this sequential operation and comprises a reciprocable interference bolt 175 which is adapted to be engaged by a boss 176 formed on the switch lever 48 so that as the same is raised it will lift the bolt 175 and move the head 176 thereof in an interfering position behind the head 177 of the latch lever 165, and it will be held in this position by the latch 168. In the operation of this device the lines 173 and 174 are energized once to change the rate of operation and then subsequently energized again to effect complete stoppage of the machine. Upon the first energization of lines 173 and 174 the magnet 172 will withdraw the latch 168 permitting the switch lever 48 to move to its slow speed position under actuation of the spring 121. Simultaneous operation of magnet 171, however, will cause the head 177 of latch 165 to frictionally engage the head 176 of interference member 175. The frictional engagement will be sufficient to prevent the interference member 175 from dropping by gravity and therefore the switch lever 132 will not be released at this time. Since the first energization of lines 173 and 174 is only momentary the magnet 171 will be deenergized and this will permit the interference member 175 to drop by gravity so that upon the second energization of this pair of lines the latch will be free to be withdrawn and permit opening of the switch lever 132 by spring 138.

It will now be seen that if the magnets 171, 172 and 141 are all de-energized that actuation of the push button 158 will effect closing of both switch levers and automatic latching of the same in a closed position and also an automatic withdrawal of the plunger 146 from the path of movement of the switch lever 132. It will also be noted that when solenoid 141 and magnet 172 are now energized that the switch lever 48 will be free to move from its high speed position to its low speed position. A subsequent energization of the magnet 171 will permit operation of the switch 132 by spring 138, thereby disconnecting the prime mover 21 from its source of power and also applying the brake 127 to insure instant stoppage of the slide.

The manner in which the control circuit is interconnected serially through the various dials for automatic control thereby in accordance with their respective relative positions, will now be considered and for the sake of clarity the connection will first be considered diagrammatically. In order to prevent arcing as much as possible at the contact points, a low potential transformer including a primary 178 which is connected by lines 179 and 180 across the main power lines 111 and 131; and a secondary 181 having terminals 182 and 183 has been provided. If direct current is desired the secondary 181 may be connected to a two-plate vacuum tube 260 as shown in Figure 23, the terminal 182 then being connected at an intermediate point in secondary coil while the terminal 183 would be connected to the middle point of the auxiliary secondary 181' which furnishes the power for lighting the filament all in the usual manner of such devices. The terminal 182 is connected by line 173 through serial contacts 258 and 259 to the magnets 171 and 172, and also by line 184 to the solenoid 141 and the push button interlock solenoid 185. The return line 174 from the solenoids 171 and 172 is connected to the contact point 186 on the movable dial 65. This contact point cooperates with contact point 187 on the fixed dial 96 which is permanently connected to contact point 188 on movable dial 67. The fixed dial 97 has an elongated contact plate 189 which extends circumferentially from the zero mark beyond the numeral 1 in one direction, and beyond the numeral 9 in the other direction. The purpose of this will be explained hereafter.

This contact plate is permanently connected at all times to the contact point 190 on the movable dial 80 which is adapted to cooperate with the contact point 191 on the fixed dial 98. The movable dial 90 has a contact point 192 which is permanently connected at all times to contact 191 and adapted to cooperate with contact 193 formed on the fixed dial 99. The contact 193 is connected by line 194 to the terminal 183 of the low potential transformer. The dial 67 also carries another pair of contact points 195 and 196 which are adapted to engage respectively the contacts 197 and 198 carried by the fixed dial 97. The contact point 198 is connected by line 199 to one terminal of the solenoid 141 and contact 197 is connected by line 200 to the remaining terminal of solenoid 185. The contact 195 is connected by line 202 to line 174 while contact 196 is permanently connected by line 204 to contacts 187 and 188.

A brief description of some of the possible settings of the dials will now be given as it is believed that these will clarify the operation and control of the electrical circuit by the dials and reference may now be had to Figures 15, 16, 17 and 18.

Figure 15:
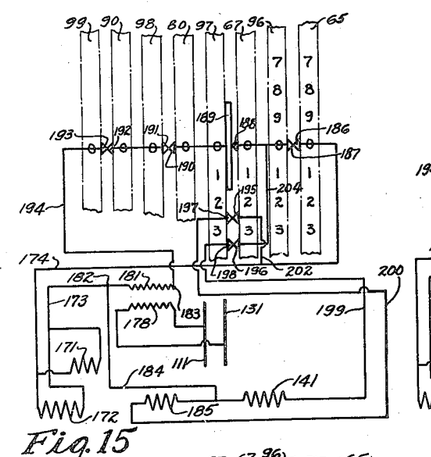
Figures 15 to 18 inclusive are diagrammatic views of the electrical circuit showing the connections for various settings of the stationary dials.

In Figure 15 it will be noted that all of the dials both stationary and movable, stand at zero reading which would be the position of the parts before any measuring is done. It will be noted that the circuit through magnets 171 and 172 is closed, the current flowing from the terminal 183 of transformer 181 through line 194, contacts 193, 192, 191, 190, 189, 188, 187, 186 and line 174, then through the magnets 171, 171 in parallel and returning through line 173 to the other terminal 182 of the transformer. It will also be noted that the solenoid 141 is energized, the current flowing from the terminal 183 of the transformer through line 194, contacts 193, 192, 191, 190, 189, 188, line 204, back through contacts 196 and 198, the last contact being connected by conductor 199 to one terminal of solenoid 141, the current continuing through line 184 to the other terminal 182 of the transformer. The push button interlock solenoid 185 is also energized, the current flowing from the terminal 183 through line 194, contact 193, 192, 191, 190, 189, 188, 187, 186 and line 202, contacts 195, 197, line 200 to the solenoid 185 and returning through line 184 to the terminal 182 of the transformer. This means that the push button is held in a locked position by the interlock plunger 207 which is reciprocably mounted in the solenoid 185 and normally held in a non-locking position by a spring 208. The plunger 207 is adapted to engage a transverse slot 209 formed in the member 146. Also the plunger 142 of the solenoid 141 is in a position to withdraw the pivoted link 139 to such a position that it will not engage the projecting lug 140 of the switch lever 48. Further the latch members 177 and 168 are held in a withdrawn position due to the energization of their operating magnets 171 and 172 respectively.

It will thus be apparent that the machine cannot be started while all of the dials are set at a zero reading due chiefly to the position of the push button interlock pin 207.

Figure 16:
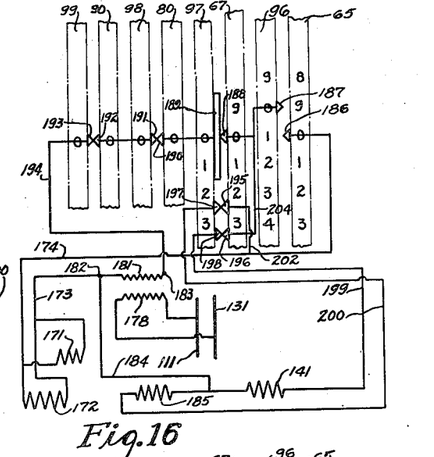

In Figure 16 the adjustable dial 96 has been positioned to give a reading of one thousandth of an inch. The adjustment of this one dial will disconnect contact 187 from contact 186 and thereby break the previously described circuit to magnets 171 and 172 thereby releasing the latch members 177 and 168. These latches are now in a position to lock the switch members 132 and 48 when the same are moved. Since the contacts 193 and 196 are still in engagement, and this portion of the circuit is independent of contacts 186, 187 the solenoid 141 is still energized thereby holding the link 139 in its previously described position, but the opening of contacts 187 and 186 broke the circuit to solenoid 185 causing the spring 208 to come into action and effect withdrawal of the push button interlock plunger 207. It will now be apparent that the push button 158 can be depressed which will only operate the switch lever 132 due to the withdrawn position of the link 139. The switch lever, however, will not be locked in position until the downward movement of the push button has been completed. Upon completion of the downward movement, the pawl members 148 will be moved inward thereby releasing the plunger 146. Upon closure of the switch 132 the dial driving mechanism will effect rotation of the dial 65 until the contact 186 carried thereby engages contact 187. This will immediately close the circuit again through magnets 171 and 172, effecting withdrawal of the latch member 177 and opening of the switch 132 by the spring 138. This will effect complete stoppage of the machine.

Figure 17:
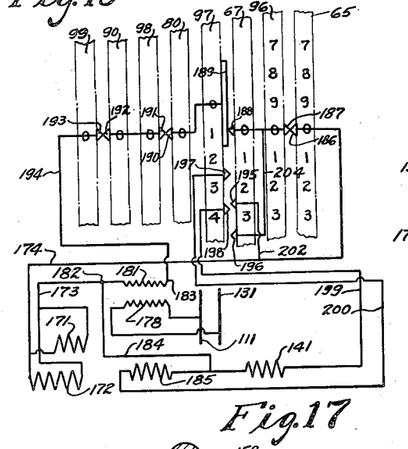

In Figure 17 the adjustable dial 97 has been moved from the position shown in Figure 15 to a position giving a reading of ten thousandths of an inch. It will be noted, in this case, that due to the length of the arcuate-shaped contact piece 189 the circuit through the magnets 171 and 172 is not broken and therefore both of the latch members 177 and 168 will be held in a withdrawn position. It will be further noted, however, that although the contacts 186 and 187 are in engagement that contacts 195 and 194 have been separated. This will break the circuit through line 200 and solenoid 186 thereby releasing the push button for operation but the circuit through solenoid 141 is still complete, because contact 198 has moved into engagement with contact 195 the current flowing from contact 186, through line 202 contacts 195, 198 and 199, and returning from the solenoid through line 184 to the terminal 182 of the transformer. It will therefore be seen that when the push button is depressed that the latch 177 is not in position to catch the switch lever 132 but as soon as the plunger moves downward, the switch element 257 will open the circuit at contacts 258 and 259 thereby releasing latch 177 so that it may engage the lever. When the plunger 146 is fired or returned it will be noted that it first closes the circuit through the motor which causes a slight movement of the dial which is sufficient to break the circuit at contacts 187 and 186 even although the switch member 257 re-engages contacts 258 and 259. The dial 65 will continue to rotate at a slow speed because the switch member 48 was not closed in this operation, and when the numeral 9 on the dial 65 is opposite the numeral 0 on dial 96, the dial 67 will start to index and both dials will move simultaneously until contact 186 engages contact 187 and completes the circuit through magnet 171 which will thereby cause the switch 132 to open by means of the spring 138 and the machine will stop instantaneously.

Figure 18:
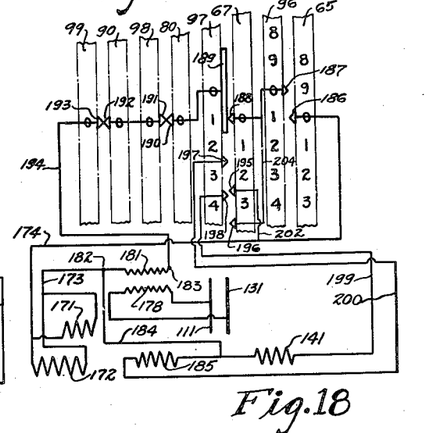

In Figure 18 the movable dials have been set to give a reading of eleven thousandths of an inch in which case the circuit through magnets 171 and 172 will be broken due to the separation of contacts 187 and 186. Also the circuit through solenoid 141 will be broken due to the separation of contacts 187 and 186. In addition the circuit through solenoid 185 will be broken due to the separation of contacts 197 and 195. It will now be seen that the link 193 is in position for the first time to engage the switch lever 48 and upon depression of the push button, both switch levers 132 and 48 will be locked by their respective latches 177 and 168. This will also move the head 176 of the interference member 175 to a position behind the latch 177. The machine will now start at a fast rate which will continue for one thousandth of an inch at which time contact 186 will engage contact 187 and the circuit will be completed through magnets 171 and 172 which will only cause withdrawal of the latch 168, in the manner previously explained, and at the same time the circuit through solenoid 141 will be completed by contact 186 engaging contact 187. Since both the solenoid 141 and magnet 172 are now energized, the switch 48 is free to move to its slow speed position under the action of its spring 121. The machine will now continue at a slow speed until the dial 65 has made one complete revolution at which time it will be in the same position as now shown in Figure 18 and then the indexing movement of the dial 67 will commence and both dials will move together until contact 186 re-engages the contact 187. This will cause a second closing of the circuit through magnet 171 and the interference piece 176 having by this time dropped out by gravity from the path of movement of the latch 177, the latch is free to be withdrawn and the switch 132 opened by its spring 138. This will cause immediate stoppage of the machine. It will also be noted at this time that the contact 196 has been moved again into engagement with the contact 198 due to the indexing movement imparted to the dial 67 so that if a subsequent movement of ten thousandths of an inch or less is desired, the solenoid 141 will be energized and the link 139 will be in a withdrawn position so that the machine will operate at a slow rate of speed.

In Figure 2 the adjustable dials have been set to give a reading of 7.315 inches. In this case the circuit through all of the solenoids 185, 141, 171 and 172 is broken due to the separation of the pair of contact points 192 and 193 as well as several of the others. This means that the push button is able to be actuated and that both switches will be closed and the machine will start operation at a high rate of speed. This will continue until the various movable dials 90, 80 and 67 have been indexed to give a reading of 7.305. At this reading the contact 186 will be in engagement with contact 187, contact 188 will engage contact 189, contact 190 will engage contact 191 and contact 192 will engage contact 193. This will cause the first energization of magnets 171 and 172 and thereby a slowing down of the machine due to the operation of switch 48. The dial 65 will continue to rotate after effecting momentary contact between points 186 and 187, until the second contact is made at which time the dial 67 will have been indexed to give a reading of 7.315. This will cause a second energization of magnet 171 and opening of the switch 132 thereby stopping the machine.

In Figure 3 the construction of the various dials is shown whereby these various connections may be made and which will now be described. The adjustable dials 96, 97, 98 and 99 each have a flanged metallic hub member 210 formed of electrical conducting material and the bore of each member is lined with insulating material 211 whereby the hub 210 may be insulated from the shaft 95. Surrounding the hub member 210 is the annular member 212 which is formed of insulating material and molded or otherwise integrally secured on the hub. The member 212 has a shoulder 213 to which is secured the worm gear 99 which serves as means for adjusting the dial. The member 212 also has an annular rib 214, the periphery of which carries the numerals which may be printed directly thereon, but preferably printed on a separate strip which may be attached thereto. The rotatable dials are similarly formed with a metallic hub member of electrical conducting material having a bore lined with insulating material and an exterior annular member having a shoulder thereon to which the driving gear is attached. These dials are mounted on the shaft 95 in the manner shown in Figure 3 and for free rotation relative to the shaft. It will be noted that the insulating sleeve 211 is flanged at one end so as to abut the flange of the sleeve of its cooperating rotatable dial so as to form a spacer therebetween and also to insulate one fixed dial from its cooperating rotatable dial.

Figure 5:
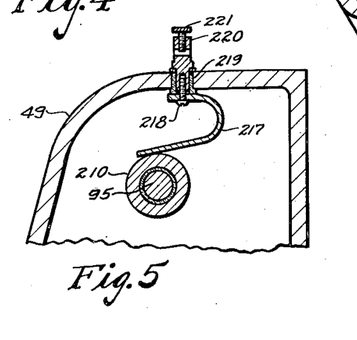
Figure 5 is a detail section on the line 5—5 of Figure 3.

A spring 215 surrounding an insulating sleeve 216 carried by the shaft 95 serves to maintain an end pressure on all of these dials so that certain parts are in constant electrical contact with one another. For instance, the hub of adjustable dial 96 contacts the hub of the rotatable dial 67 while the hub of dial 97 contacts the hub of dial 80 and the hub of dial 98 contacts the hub of dial 90. The hub of dial 65 is elongated beyond its circumscribing annular member 212 for receiving the brush 217 which is secured to the underside of the box by screw 218 but insulated therefrom by the sleeve 219 which is formed of insulating material. The construction of this brush is more particularly shown in Figure 5 and is of U-shape so as to provide a certain amount of spring to insure a constant electrical contact with the hub. The screw 218 is secured in the bottom of a binding post 220 to which the conductor 174 is secured by the binding screw 221.

Each of the adjustable dials with exception of dial 97 has secured to the flanged face of the hub member a wedge shaped contact point 222 corresponding to contacts 187, 191 and 193 of the diagrams. Each one of the rotatable dials 61, 67, 80 and 90 have a contact plunger 223 held projected by a spring 224. These plungers correspond to contacts 186, 188, 190 and 192 of the diagrams.

The projection of these plungers is limited to a certain extent so that they will be sure to engage the contact 222 but will not project out far enough to continuously engage the flange of the hub because otherwise no make and break contact would be possible.

The hub 211 of dial 99 is extended similarly to hub of dial 65 with a brush 217 secured to the end of a second binding post 220 to which is secured the conductor 194. The zero numerals on all of the dials whether adjustable or movable, are so arranged as to be in horizontal alignment when each plunger 223 is in engagement with its respective contact 222. When this is so, all the dials will read zero and the circuit from line 174 will then pass through one binding post 220 and brush 217 to the hub of dial 65 having the reciprocable plunger 223 in electrical contact therewith and engaging the contact 222 on the hub of dial 96. As previously mentioned, the hub of this dial is in constant electrical contact with the hub of dial 67 so that the current will continue to the plunger 223 carried by dial 67 which in turn will be in engagement with a contact plate 189 carried by dial 97 and so on through the series of dials to the hub of the last member which is connected by the brush 217 to the binding post 220 having the conductor 194 secured therein. The dials 67 and 97 have in addition conductor rings 225 and 226, Figures 21 and 22, respectively secured to their peripheries, the ring 225 having a brush 227 contacting therewith and electrically connected by the conductor 202 to the binding post 228 to which is secured the line 176. The ring 226 is connected by a brush 228 to the binding post 229 in which is secured the conductor 200 leading to the push button interlock solenoid. The contacts 195 and 197 are carried by the respective dials 67 and 97 for connecting the line 200 to the line 176. A second pair of contacts 196 and 198 are also carried by the respective dials, the contact 196 being electrically connected to the hub of dial 67 and thereby in electrical connection with line 174 and in parallel with contacts 222 and 223 carried by the dials 96 and 65. The other contact 198 is electrically connected to a second annular copper ring 230 carried by the dial 97 on which bears a brush 231 depending from a binding post 232. The line 199 which extends from the interlock solenoid 141 is connected to this binding post. As shown in Figures 21 and 22 the contacts 197 and 198 are at different radial distances from the center of their respective dials, while the contacts 195 and 196 have a portion which is at the same radial distance from the center as the contact 198 but the contact 195 has an elongated portion for engaging the contact 197. From this it will be seen that the contact 197 can only engage contact 195 while contact 198 is adapted to engage contacts 195 and 196 successively, these contacts being spaced a distance the sub-tended angle of which is equal to the sub-tended angle between any pair of numerals carried by the periphery of the dial.

Figure 13:
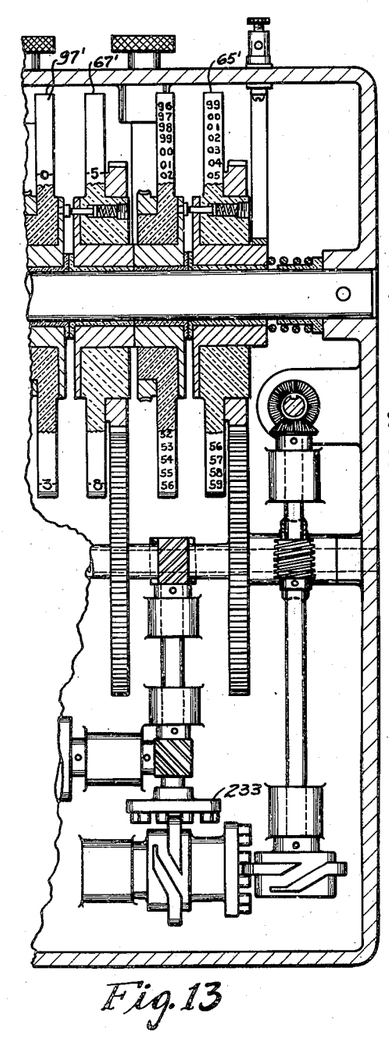
Figure 13 is a view of a modified form of the invention.

A modified form of the invention is shown in Figure 13 in which the dials are graduated or sub-divided into 100 divisions rather than in ten divisions as in the preceding form of the invention. Each one of these divisions may represent one thousandths of an inch as previously but one rotation of the dial will correspond to a hundred thousandths of an inch movement of the translatable slide rather than ten thousandths of an inch. Since the movable dial, such as 65, makes one revolution for each one hundred thousandths of an inch movement in the translatable support, the gearing ratio between the dial and lead screw will be one-tenth of what it was in the preceding construction, which means that, other things being equal, the dial will actually rotate slower than in the previous construction.

The second pair of dials 67' and 97' may also be graduated into 100 sub-divisions in which case the ratchet mechanism indicated generally by the reference numeral 233 will have a hundred to one ratio rather than a ten to one ratio. If the second pair of dials 67' and 97' are only divided into ten sub-divisions, then the ratchet mechanism at 233 may be a ten to one ratio similar to the previous embodiment, shown in Figure 3. If four decimal places are desired, then a third pair of dials may be connected in series in a similar manner as shown in Figure 3.

The electrical circuit will be the same but it will be noted that the slow movement will now occur during the last one-hundred-thousandths of an inch rather than the last ten-thousandths of an inch. Also if desired one connection may be eliminated to simplify the construction in which case the slow movement would occur for the last two-hundredths of an inch of movement.

In Figures 8, 9, 10, and 11 the invention is shown applied to a knee and column type machine and since the work for which the present measuring device is suitable is more conveniently performed with a vertical spindle, a vertical milling machine is shown although it is to be understood that the invention is equally applicable to one of the horizontal type. As shown in these figures the column 234 has guideways 235 therein for receiving and guiding a knee 236 for vertical adjustment, which may be made by means of an elevating screw 237 operated by the manual control lever 238. The knee has horizontal guideways 239 for receiving a saddle 240 which in turn has horizontal guideways 241 for receiving a horizontally reciprocable table 242. The saddle may be adjusted toward and from the column by a lead screw 243 rotatable by the hand lever 244. The drive motor 21 for the table, together with gearing such as shown in Figure 1, may be supported by the saddle with the exception that the final gears are mounted on the vertical shaft 245 which then has the bevel gear 246 mounted on one end in operative engagement with bevel gears 247. These last bevel gears are mounted coaxially of the table lead screw 248 which is journaled at opposite ends of the table and passes through a fixed nut 249 carried by the saddle. A reverser clutch 250 is interposed between the bevel gears for alternate connection therewith to determine the direction of rotation thereof. This clutch may be operated by the handle 51 and suitable intervening mechanism such as 52 more particularly shown in Figure 2. The switch box 252 may be attached to the side of the saddle as shown, with the push button 158 projecting in a convenient position for access by the operator. The meter box 49 may be attached to the other side of the saddle with its drive shaft 52 directly connected by bevel gearing 251 to the lead screw 248. This direct connection eliminates as far as possible any lost play between the movement of the lead screw and the recording dials. It will be noted that the meter box, switch box and drive motor are all mounted upon the same support and therefore may be readily inter-connected by fixed cables thereby requiring only one flexible connection from a main power source to this movable element.

There has thus been provided by this invention an electrical measuring device which may be readily aligned to any movable support of a machine tool for automatically and accurately measuring any desired distance from a predetermined reference line.

What is claimed is:

1. In a device for automatically moving a machine tool slide a predetermined distance, the combination with a power actuator for the slide of a first plurality of dials graduated in accordance with the decimal system of measurement, means to adjust said dials to give a reading equal to the length to be moved, a second plurality of dials also graduated in accordance with the decimal system of measurement including a first dial coupled to the slide for actuation thereby, index mechanisms successively connecting the remaining dials for actuation by the first dial whereby each successive dial will be intermittently moved a fraction of a revolution for each complete revolution of the preceding dial, and means operable by the second plurality of dials on movement to a position yielding the same reading as the first plurality of dials to stop the slide.

2. In a device of the class described the combination of a movable slide, a power actuator therefor, a pair of measuring dials having graduations thereon, means to adjust the dials to collectively yield a desired measurement, a second pair of similarly graduated dials one of which is connected to the slide for movement thereby, index mechanism connecting the remaining dial to the first dial for recording the complete revolutions made thereby, means operable by the first dial upon completion of all but the last revolution thereof to effect a reduction in the rate of movement of the slide, and additional means operable upon completion of the last revolution to stop the slide.

3. In a device of the class described the combination with a movable slide, of a preselecting measuring mechanism positionable to yield a desired measurement to be moved by the slide, a power actuator, means to couple the slide to the actuator for relative high speed movement, mechanism coupled to the slide for micrometrically recording the distance as moved, means operable by said mechanism at a predetermined distance from the end of said movement to reduce the rate of slide movement, said mechanism also being operable upon yielding a recorded distance equal to the setting of said preselecting mechanism for stopping the movement of the slide.

4. In a machine tool the combination with a movable slide, a prime mover and an electrically operated clutch for coupling the prime mover to the slide, of a control switch, manually operable means for closing the switch to energize the clutch, a latch mechanism for holding the switch in a closed position, a first graduated dial means pre-positionable to determine the length of slide movement, a second dial means simultaneously moved with the slide, co-operating contacts carried by the respective dials adapted to be closed when the reading of the two dial means is the same, and a control circuit in series with said contacts for tripping said latch mechanism and thereby opening said control switch.

5. In a machine tool having a slide, a prime mover and an electrically operated clutch for coupling the prime mover to the slide for actuation thereby, the combination of a first control switch for determining operation of the prime mover, a second control switch for determining energization of said clutch, a brake for the slide, electrically operated means coupled in series with the prime mover for releasing the brake, manually operable means for simultaneously closing said switches, a metering mechanism including a prepositionable portion for pre-selecting the length of slide movement, and a second portion coupled for simultaneous movement with the slide, and means operable upon juxtaposition of said portions for automatically releasing said switches and applying the brake to stop the slide.

6. In a machine tool having a slide, a prime mover, and electrically operated clutches for coupling the prime mover to the slide in various ratios, a starting switch for determining operation of the prime mover, a rate control switch in series with the starting switch, manually operable means for simultaneously closing the starting switch and moving the rate control switch to a high speed position, a metering mechanism for measuring the length of slide movement, means automatically operable by said mechanism at a predetermined distance from the end of said movement for throwing the rate control switch to a slow speed position, and additional means operable by the metering mechanism for opening the starting switch upon completion of said movement.

7. In a machine tool having a slide, a prime mover, and electrically operated clutches for coupling the prime mover to the slide in different ratios, a rate control switch for said clutches, means normally maintaining said switch in a slow speed position, a starting switch for the prime mover, an interlock for coupling the rate control switch for simultaneous movement with the starting switch, and means for automatically disconnecting said interlock when the length that the slide is to be moved in less than a predetermined amount.

8. In a machine tool having a work support and a cutter support having a rotatable cutter journaled therein, the combination with a rotatable screw for effecting adjustment of one of said supports laterally of the other, and a prime mover, of means for controlling said movement including a control box having a rotatable part adapted to be detachably, operatively connected to the screw, prepositionable means in the control box for predetermining the length of said movement, means operable by said member for concurrently measuring the movement as effected and control means operable when the reading of each of said means is the same to disconnect the prime mover from the screw.

9. In a machine tool having a pair of supports, one of which is movable transversely of the other for effecting a predetermined relative movement between a cutter and a work piece, the combination with an actuator for effecting said relative movement, and a prime mover therefore, of a control box, a control circuit including a power operable clutch for connecting the prime mover to the actuator, said circuit terminating at the control box, a first set of dials mounted in the box and prepositionable to predetermine the length of said movement, a set of horizontally arranged windows cooperating with said dials, a second set of dials journaled in the control box and operatively connected for movement with the actuator, a second set of windows aligned in a different plane from the first set of windows for concurrently recording the movement as effected, and means operable by said second set of dials when rotated to give a reading equal to the reading of the first set of dials for closing the termini of said control circuit and cause de-energization of said clutch and thereby disconnection of the prime mover from said actuator.

10. In a machine tool the combination with a movable slide, a prime mover, and an electrically operated clutch for coupling the prime mover to the slide of a control switch, manually operable means for closing the switch to energize said clutch, a latch mechanism for holding the switch in a closed position, a first and second dial means, one of which is prepositionable to determine the length of slide movement and the other simultaneously movable with the slide, a control circuit including cooperating contacts carried by the respective dial means adapted to be closed when the reading of the two dials means is the same to effect tripping of said latch mechanism, and additional control means between the prime mover and slide for temporarily stopping the slide in the midst of its movement without disturbing said circuit connections.

11. In a machine tool having a work support and a tool support, the combination with means for effecting movement of one support laterally of the other, a predetermined amount, a prime mover, an electrically operated starting clutch for coupling the prime mover to cause said movement, and means between the prime mover and the actuated slide for determining the direction of said movement, of a control switch, manually operable means for closing the switch to energize the clutch, a latch mechanism for holding the switch in a closed position, a first graduated dial means prepositionable to determine the length of movement in either direction, a second dial means simultaneously movable with the actuated slide, cooperating contacts carried by the respective dials and adapted to be closed when the reading of the two dials means is the same, and a control circuit in series with said contacts for tripping said latch mechanism and thereby opening said control switch to stop the slide regardless of its direction of movement.

12. In a device for automatically translating a part a predetermined distance, the combination of a plurality of adjustable dials, a plurality of movable dials, means to position the adjustable dials to indicate the distance to be moved by the part in opposite directions, a source of power, means for connecting the part to said source for movement thereby, means operatively connecting the movable dials for simultaneous movement with the part, power means operable for disconnecting the source of power from said part and including a control circuit having one terminus in the adjustable dials, said circuit having a second terminus in the movable dials, said termini adapted to be closed when the movable dials have traveled the same amount as the adjustable dials were prepositioned.

13. In a device for automatically translating a movable part of a machine tool a prescribed distance, the combination of a source of power, branch transmissions actuated thereby at different rates, means for connecting the movable part with one of said transmissions for movement thereby, a plurality of graduated dials operatively connected for simultaneous movement with the part, and means automatically operable by said dials upon indication thereby that the movable part has been translated the prescribed distance to disconnect the part from said transmission.

14. In a machine tool having a cutter support and a work support the combination of means for automatically effecting a prescribed relative translation between the supports including a prime mover, branch transmissions actuated thereby at different rates, a plurality of adjustable and movable graduated dials, means to position the adjustable dials to indicate the distance to be moved by the support, means for connecting one of said supports selectively with one of said transmissions determinable by the position of said adjustable dials, means operatively connecting the movable dials for simultaneous movement with the movable support, and means automatically operable when the reading of the movable dials is equal to the reading of the adjustable dials for disconnecting the movable support from said transmissions.

15. In a device for automatically measuring the power movement of a machine tool slide having a prime mover and branch transmissions actuated thereby at different rates for selective connection with the slide, the combination of a first plurality of graduated members prepositionable in accordance with the distance the slide is to be moved, a second plurality of graduated members operatively coupled for simultaneous movement with the slide, means governed by the position of the first plurality of dials for connecting the slide with one or the other of said transmissions and means operable by the second plurality of dials upon yielding a reading equal to the reading of the first plurality of dials for automatically disconnecting the slide from said transmissions.

16. A measuring device for a machine tool slide including a prime mover, a pair of branch transmissions operable by the prime mover at different rates, power operable clutches for connecting either transmission to the slide for actuation thereby, a first means prepositionable to indicate micrometrically the distance to be moved, said means selectively determining the clutch to be energized, a second means employed for movement with the slide to indicate the distance concurrently moved, manually operable means for closing a circuit through the selected clutch to cause movement of the slide, and means automatically operable for opening said circuit after the slide has moved the prescribed measured distance.

17. An automatic measuring means for machine tools having a movable slide, a prime mover and branch transmissions actuable by the prime mover for selective connection with the slide including power operable clutches for selectively connecting the transmissions with the slide, a selector switch for determining energization of the clutches, a power control circuit leading to said switch, manually operable means for closing said circuit to the switch, and means automatically operable by the slide after a predetermined movement thereof for opening said circuit and de-energizing the connected clutch.

18. In a device for automatically moving a machine tool slide a predetermined distance the combination with a power actuator for the slide, of a first plurality of dials graduated in accordance with the decimal system of measurement, means to adjust said dials to give a reading equal to said distance, a second plurality of dials similarly graduated and including a first dial coupled to the slide for actuation therewith, motion transmitting connections successively connecting the remaining dials for intermittent actuation by the first dial and means operable by the second plurality of dials upon yielding a reading equal to said prescribed distance to stop the movement of the slide.

19. In a device for automatically translating a movable slide of the machine tool a predetermined distance in either one of two directions with respect to a tool, the combination of means for determining the direction of movement, a plurality of adjustable and movable graduated dials, means to position the adjustable dials to indicate the distance to be moved in the prescribed direction, a source of power, means for connecting the slide with said source for movement thereby, said movable dials being operatively connected for simultaneous movement with the part regardless of its direction of movement, and power means operable for disconnecting the slide from the source of power including a control circuit having termini in the adjustable and movable dials respectively and adapted to be closed when the reading of one set of dials equals the reading of the other set of dials.

BERNARD SASSEN.